US007752538B2

(12) United States Patent
Vion-Dury

(10) Patent No.: US 7,752,538 B2
(45) Date of Patent: Jul. 6, 2010

(54) GRAPHICAL SYNTAX ANALYSIS OF TABLES THROUGH TREE REWRITING

(75) Inventor: Jean-Yves Vion-Dury, Saint-Ismier (FR)

(73) Assignee: Xerox Corporation, Norwalk, CT (US)

( * ) Notice: Subject to any disclaimer, the term of this patent is extended or adjusted under 35 U.S.C. 154(b) by 991 days.

(21) Appl. No.: 11/493,203

(22) Filed: Jul. 26, 2006

(65) Prior Publication Data

US 2008/0028291 A1   Jan. 31, 2008

(51) Int. Cl.
*G06F 17/27* (2006.01)
(52) U.S. Cl. .................. 715/228; 715/211; 715/227
(58) Field of Classification Search .............. 715/228, 715/212, 217, 240; 358/3.2
See application file for complete search history.

(56) References Cited

U.S. PATENT DOCUMENTS

| 5,317,686 | A  | * | 5/1994  | Salas et al. .......... 715/212 |
| 5,867,159 | A  | * | 2/1999  | Hamada et al. ....... 345/443 |
| 6,006,240 | A  |   | 12/1999 | Handley |
| 6,434,270 | B1 | * | 8/2002  | Ohara et al. .......... 382/178 |
| 6,785,420 | B2 | * | 8/2004  | Yamaai ............... 382/199 |
| 7,146,562 | B2 | * | 12/2006 | Janssen .............. 715/220 |
| 7,487,438 | B1 | * | 2/2009  | Withers .............. 715/223 |
| 2004/0181401 | A1 | * | 9/2004 | Pachet et al. .......... 704/223 |

OTHER PUBLICATIONS

U.S. Appl. No. 11/451,525, filed Jun. 12, 2006, Vion-Dury.
U.S. Appl. No. 11/312,267, filed Dec. 20, 2005, Vion-Dury.
Zanibbi et al., "A Survey of Table Recognition: Models, Observations, Transformations, and Inferences," Oct. 24, 2003.
Baba et al., "Eviss: a Visual System Having a Spatial Parser Generator," Proc. of 3rd Asia Pacific Conf. on Computer Human Interaction, 1998 (CHI '98), pp. 158-164, Jul. 15-17, 1998.
Kameyama et al., "Developing a Graphical Definition System for a Spatial Parser Generator," Proc. of the 8th Int'l conf. on Information Visualization, (IV' or), pp. 221-226, Jul. 14-16, 2004.
Green et al., "Model-based Analysis of Printed Tables," Proc. of 3rd ICDAR, 1995, vol. 1 (1995).
Gatos et al., "Automatic Table Detection in Document Images," 3rd Int'l Conf. on Advances in Pattern Recognition, ICAPR 2005, Bath, UK, Aug. 22-25, 2005.
Allen, "Maintaining Knowledge about Temporal Intervals," Communications of the ACM, vol. 26, No. 11, (1983).
Ferrucci et al., "On the Generation and Recognition of Visual Languages: . . . ," Int'l Workshop on theory of Visual Languages, May 30, 1996, Guggio, Italy, (1996).

(Continued)

*Primary Examiner*—Joshua D Campbell
*Assistant Examiner*—Christopher Bryant
(74) *Attorney, Agent, or Firm*—Fay Sharpe LLP

(57) ABSTRACT

To determine a table structure, a spatially ordered sequence of rectangular cells (42) disposed in a two dimensional region is derived. The ordered sequence of rectangular cells is parsed in accordance with a two-dimensional structural grammar (54) having terminal elements corresponding to cells and non-terminal elements corresponding to structural relationship operators. The parsing produces a grammatical expression (52) with the cells represented by terminal elements and structural relationships represented by non-terminal elements.

13 Claims, 15 Drawing Sheets

OTHER PUBLICATIONS

Aiello et al., "Thick 2D Relations for Document Understanding," University of Trento, Technical Report #DIT-02-0063, Italy, 2002.

Green et al., "Table Image Understanding," at http://citeseer.ist.psch.edu/163777.html, (1996).

Zanibbi et al., Recognizing Mathematical Expressions Using Tree Transformation, IEEE Transactions on Pattern Analysis and Machine Intelligence, vol. 24, No. 11, Nov. 2002.

Pfeiffer, JR., "Parsing Graphs Representing Two Dimensional Figures," IEEE Proc. Workshop on Visual Language, Sep. 1992.

Tsuruoka et al., Region Segmentation for Table Image with Unknown Complex Structure, IEEE, $6^{th}$ Int'l Conf. Doc. Analysis and Recognition (ICDAR), 2001.

Amano et al., "Table Form Document Synthesis by Grammar-Based Structure Analysis," IEEE, pp. 533-537, 2001.

* cited by examiner

| | Initial $s_i = \langle p_1, p_2 \rangle$ $s_j = \langle p_3, p_4 \rangle$ | Canonical | Initial Points Ordering | Adjustment(s) |
|---|---|---|---|---|
| Overlapping (and $s_i < s_j$) | $p_1$ $p_2$ $p_3$ $p_4$ | $p_1$ $p_3$ $p_4$ $p_3$ | $p_1 < p_3 < p_2 < p_4$ | $s_j = \{p_1, p_3\}$ ($p_2$ is replaced by $p_3$) |
| | $p_1$ $p_2$ $p_3$ $p_4$ | $p_1$ $p_2$ $p_4$ $p_2$ $p_4$ | $p_1 \sim p_3 < p_2 < p_4$ | $s_j = \{p_2, p_4\}$ ($p_3$ is replaced by $p_2$) |
| | $p_1$ $p_2$ $p_3$ $p_4$ | $p_1$ $p_3$ $p_4$ $p_2$ $p_3$ $p_4$ | $p_1 < p_3 < p_4 < p_2$ | $s_j = \{p_1, p_3\}$ ($p_2$ is replaced by $p_3$) and insert a new $s_{k+1} = \{p_4, p_2\}$ |
| Containing (and $s_i < s_j$) | $p_1$ $p_2$ $p_3$ $p_4$ | $p_1$ $p_4$ $p_2$ $p_3$ $p_4$ | $p_1 \sim p_3 < p_4 < p_2$ | $s_j = \{p_1, p_4\}$, $s_j = \{p_4, p_2\}$ |
| | $p_1$ $p_2$ $p_3$ $p_4$ | $p_1$ $p_3$ $p_4$ $p_2$ $p_3$ | $p_1 < p_3 < p_4 \sim p_2$ | $s_j = \{p_1, p_3\}$ ($p_2$ is replaced by $p_3$) |

*FIG. 2*

FIG. 4
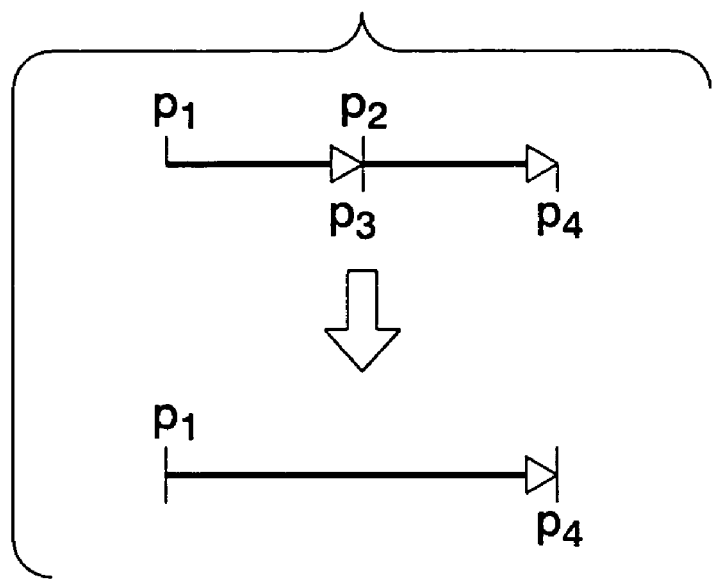
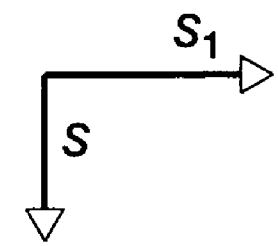
FIG. 5
Forks(s) = [$s_1$]
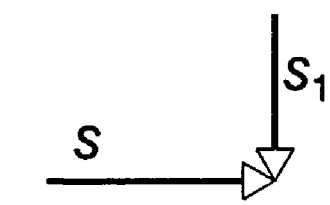
FIG. 6
Meets(s) = [$s_1$]

Joins(s) = [$s_1$, $s_2$]

HC(s) = [s, $s_1$, $s_2$]
HCS($s_2$) = [$s_2$, $s_1$, s]

VC(s) = [s, $s_1$, $s_2$]
VCS($s_2$) = [$s_2$, $s_1$, s]

i1 = i0+1
i2 = i1+1
i3 = i2+m
(m>1)

i1 = i0+1
i2 = i1+1
i3 = i2+m
(m>1)

i1 = i0+1
i2 = i1+m
i3 = i2+1
i4 = i3+n
i5 = i4+1
(m>1, n>1)

| Operator | Abbreviation | Semantics | Example |
|---|---|---|---|
| a AboveLeft b | AL | $meets^Y(a,b) \wedge (start^X(a,b) \vee startedBy^X(a,b))$ |  |
| a AboveRight b | AR | $meets^Y(a,b) \wedge (ends^X(a,b) \vee endedBy^X(a,b))$ |  |
| a AboveEq b | AE | $meets^Y(a,b) \wedge equals^X(a,b)$ |  |
| a LeftUpper b | LU | $meets^X(a,b) \wedge (start^Y(a,b) \vee startedBy^Y(a,b))$ |  |
| a LeftBottom b | LG | $meets^X(a,b) \wedge (ends^Y(a,b) \vee endedBy^Y(a,b))$ |  |
| a LeftEq b | LE | $meets^X(a,b) \wedge equals^Y(a,b)$ |  |
| a Overlaps b | O | See FIG. 16 for definition |  |
| a Contains b | C | $weakContains^X(a,b) \wedge weakContains^Y(a,b)$ |  |

| RULE | | | Illustration | DEFINITION |
|---|---|---|---|---|
| Order | | Name | | For all relation $\alpha$ |
| Group | Internal | | | |
| | $<gen_3$ | $gen_1$ | | $Contains(\alpha(r_1,r_2),r_3) \wedge$ $(Contains(r_2,r_3) \rightarrow$ $\alpha(r_1,Contains(r_2,r_3))$ |
| | $>gen_1$ | $gen_2$ | | $Contains(\alpha(r_1,r_2),r_3) \wedge$ $(Contains(r_1,r_3) \rightarrow$ $\alpha(Contains(r_1,r_3),r_2)$ |
| | $<gen_2$ | $gen_3$ | | $Contains(Contains(r_1,r_2),r_3) \wedge$ $\alpha(r_2,r_3) \rightarrow \beta(r_2,\alpha(r_2,r_3))$ |
| | $<gen_2$ | $gen_4$ | | $Overlaps(\alpha(r_1,r_2),r_3) \wedge$ $(Overlaps(r_2,r_3) \rightarrow$ $\beta(r_2,Overlaps(r_2,r_3))$ |
| | | $gen_6$ | | $Contains(\alpha(r_1,r_2),r_3) \wedge$ $(Overlaps(r_2,r_3) \rightarrow$ $\beta(r_1,Overlaps(r_2,r_3))$ |
| $>gen_1$ | $>a_2$ | $a_1/a_1b$ | | $Contains/Overlaps(AboveLeft$ $(r_1,r_2),r_3) \wedge LeftUpper(r_2,r_3) \rightarrow$ $AboveLeft(r_1,LeftUpper(r_2,r_3))$ |
| | $<a_1$ $<a_1b$ | $a_2$ | | $Contains(AboveLeft(r_1,r_2),r_3) \wedge$ $AboveRight(r_1,r_2) \wedge$ $LeftUpper(r_2,r_3) \rightarrow$ $AboveEq(r_1,LeftUpper(r_2,r_3))$ |
| | $>a_4$ | $a_1$ $a_3b$ | | $Contains/Overlaps(AboveLeft$ $(r_1,r_2),r_3) \wedge LeftEq(r_2,r_3) \rightarrow$ $AboveLeft(r_1,LeftEq(r_2,r_3))$ |

*FIG. 20A*

| RULE | | | Illustration | DEFINITION |
|---|---|---|---|---|
| Order | | Name | | For all relation α |
| Group | Internal | | | |
| >gen₁ | <a₃ <a₃b | a₄ | 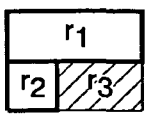 | Contains(AboveLeft(r₁,r₂),r₃)∧ AboveRight(r₁,r₃)∧LeftEq(r₂,r₃) → AboveEq(r₁,LeftEq(r₂,r₃)) |
| | >a₈ | a₅/a₅b | 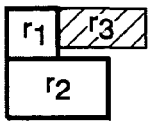 | Contains/Overlaps(AboveLeft (r₁,r₂),r₃)∧LeftUpper(r₁,r₃) → AboveLeft(r₁,LeftUpper(r₂,r₃)) |
| | >a₇ | a₆/a₆b | 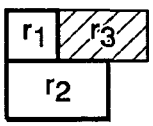 | Contains/Overlaps(AboveLeft (r₁,r₂),r₃)∧LeftEq(r₁,r₃) → AboveLeft(LeftEq(r₁,r₃),r₂)) |
| | <a₆ <a₆b | a₇ | 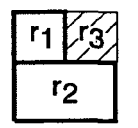 | Contains(AboveLeft(r₁,r₂),r₃)∧ LeftEq(r₁,r₃)∧AboveRight(r₃,r₂) → AboveEq(LeftEq(r₁,r₃),r₂)) |
| | <a₅ <a₅b | a₈ | 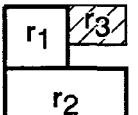 | Contains(AboveLeft(r₁,r₂),r₃)∧ LeftUpper(r₁,r₃)∧AboveEq (LeftUpper(r₁,r₃),r₂) → AboveEq(LeftUpper(r₁,r₃),r₂)) |
| >gen₂ | | b₁/b₁b | 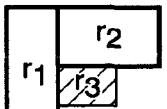 | Contains/Overlaps(LeftUpper (r₁,r₂),r₃)∧AboveLeft(r₂,r₃) → LeftUpper(r₁,AboveLeft(r₂,r₃)) |
| | <b₁ <b₁b | b₁/b₁b | 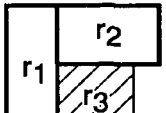 | Contains/Overlaps(LeftUpper (r₁,r₂),r₃)∧AboveLeft(r₂,r₃)∧ LeftBottom(r₁,r₃) → LeftEq(r₁,AboveLeft(r₂,r₃)) |
| | | b₃ | 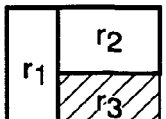 | Contains(UpperLeft (r₁,r₂),r₃)∧AboveEq(r₂,r₃)∧ LeftBottom(r₁,r₃) → LeftEq(r₁,AboveLeft(r₂,r₃)) |

*FIG. 21A*

GRAPHICAL SYNTAX ANALYSIS OF TABLES THROUGH TREE REWRITING

CROSS REFERENCE TO RELATED PATENTS AND APPLICATIONS

The following U.S. patents and patent applications are commonly owned with the present application and are each incorporated herein by reference.

Vion-Dury, U.S. application Ser. No. 11/451,525 filed Jun. 12, 2006, entitled "Methods and Apparatuses for Finding Rectangles and Application to Segmentation of Grid-Shaped Tables" is incorporated herein by reference in its entirety. This application relates at least to methods and apparatuses for finding spatially ordered sequences of rectangular cells.

Vion-Dury, U.S. application Ser. No. 11/312,267 filed Dec. 20, 2005, entitled "Normalization of Vector Based Graphical Representations" is incorporated herein by reference in its entirety. This application relates at least to apparatuses and methods for generating normalized canonical vector-based graphical representations.

Handley, U.S. Pat. No. 6,006,240 issued Dec. 21, 1999, entitled "Cell Identification in Table Analysis" is incorporated herein by reference in its entirety. This patent relates at least to identifying cells and cell separators during page recomposition processes, for example during optical character recognition processing.

BACKGROUND

The following relates to the graphical processing, document processing, information processing, and related arts. It finds example application in extracting structural layout of tables, and is described with particular reference thereto. The following finds more general application in determining structural layouts of rectangular cells of tables, grids, line art objects or representations, and so forth.

Tables are common elements in documents, and the contents of such tables typically contribute substantially to the informational content of the document. The information content of a table is often intimately related to its layout. For example, every entry in a column of a table may store a price value, while entries in another column may store item number, item name, or so forth. Accordingly, it is advantageous to determine and utilize the structural layout of the table in conjunction with extracting and interpreting the information content of the table. For example, the content may be interpreted on a row-by-row basis, or on a column-by-column basis, or so forth.

In document conversion applications, a document is converted from a source format, such as portable document format (PDF), to a more structured format such as extensible markup language (XML), hypertext markup language (HTML), or so forth. In performing such a conversion, it is advantageous to extract and retain the logical layout of a table for use in structuring the document. Such extraction can however be difficult, because different tables use different spatial layouts. For example, some tables include a line- or vector-based grid containing each cell of the document, with the topmost row of grid elements containing column headers. In other tables, the column headers are above and outside of the line- or vector-based grid. Moreover, some cells may be split or merged, so that the table deviates from a canonical row-by-row and column-by-column format. Indeed, some tables deviate strongly from such a canonical format, and include sub-rows, sub-columns, or other structures.

Some tables include line- or vector-based gridlines that provide the reader with a guide for following rows and columns of the table. In some automated table reading approaches, these line- or vector-based gridlines are ignored, and a purely text-based analysis is performed. Such a text-only approach will lose the spatial layout information typically provided by the gridlines. However, extracting useful information about the logical layout of the table from the gridlines has heretofore been difficult.

BRIEF DESCRIPTION

According to aspects illustrated herein, there are provided method and apparatus embodiments.

In an example method embodiment, a method is disclosed for determining a table structure. A table structure is determined respective to a first two cells of a spatially ordered sequence of rectangular cells. The table structure includes elements indicative of the first two cells and at least one element indicative of a structural relationship between the first two cells. A minimum rectangular bounding box containing the cells of the table structure is defined. The table structure is updated with additional structure including an element indicative of a next cell of the spatially ordered sequence of rectangular cells and at least one element indicative of a structural relationship between the next cell and the minimum rectangular bounding box. The defining and updating are repeated until the cells of the spatially ordered sequence of rectangular cells are exhausted. In some embodiments, the method optionally includes, conditional upon a selected portion of the table structure satisfying a rewrite criterion, rewriting the selected portion of the table structure in accordance with a rewrite rule corresponding to the rewrite criterion.

In an example apparatus embodiment, an apparatus is disclosed operating on a spatially ordered sequence of rectangular cells representing a table. The apparatus includes: a two dimensional structural grammar having terminal elements corresponding to rectangular cells and non-terminal elements corresponding to structural relationship operators; and a structural parser configured to parse the spatially ordered sequence of rectangular cells representing the table in accordance with the two dimensional structural grammar. The parsing produces a grammatical expression indicative of spatial positions of the rectangular cells relative to one another. In some embodiments, the apparatus optionally includes a set of grammar rewrite rules, the structural parser accessing selected grammar rewrite rules to simplify the grammatical expression during parsing. In some embodiments, the apparatus optionally includes a pre-processor configured to process a document to identify the spatially ordered sequence of rectangular cells representing the table. In some embodiments, the apparatus optionally includes a logical analyzer configured to process contents of the table based at least in part on the grammatical expression indicative of spatial positions of the rectangular cells relative to one another.

In an example method embodiment, a method is disclosed for determining a table structure. A spatially ordered sequence of rectangular cells disposed in a two-dimensional region is derived. The spatially ordered sequence of rectangular cells is parsed in accordance with a two dimensional structural grammar having terminal elements corresponding to cells and non-terminal elements corresponding to structural relationship operators. The parsing produces a grammatical expression with the cells represented by terminal elements and structural relationships represented by non-terminal elements.

BRIEF DESCRIPTION OF THE DRAWINGS

FIG. 2 diagrammatically shows suitable adjustments performed by the vectors converter of FIG. 1 for removing line segment overlaps.

FIG. 4 diagrammatically shows suitable adjustments performed by the vectors converter of FIG. 1 to remove vector redundancies.

FIG. 5 diagrammatically shows vectors s, $s_1$, and $s_2$ associated with a datastructure Forks(s)=$[s_1,s_2]$.

FIG. 6 diagrammatically shows vectors s, $s_1$, and $s_2$ associated with a datastructure Meets(s)=$[s_1,s_2]$.

FIG. 15 illustrates a suitable set of two dimensional structural relationship operators employed in the grammar of the system of FIG. 14.

FIG. 16 illustrates examples of the operators of FIG. 15.

FIGS. 20A, 20B, 21A and 21B illustrate grammatical construct criteria and corresponding rewriting rules of the Standard Structural Rewriting Rule Set suitably accessed by the parser of FIG. 14.

DETAILED DESCRIPTION

Figure 1:
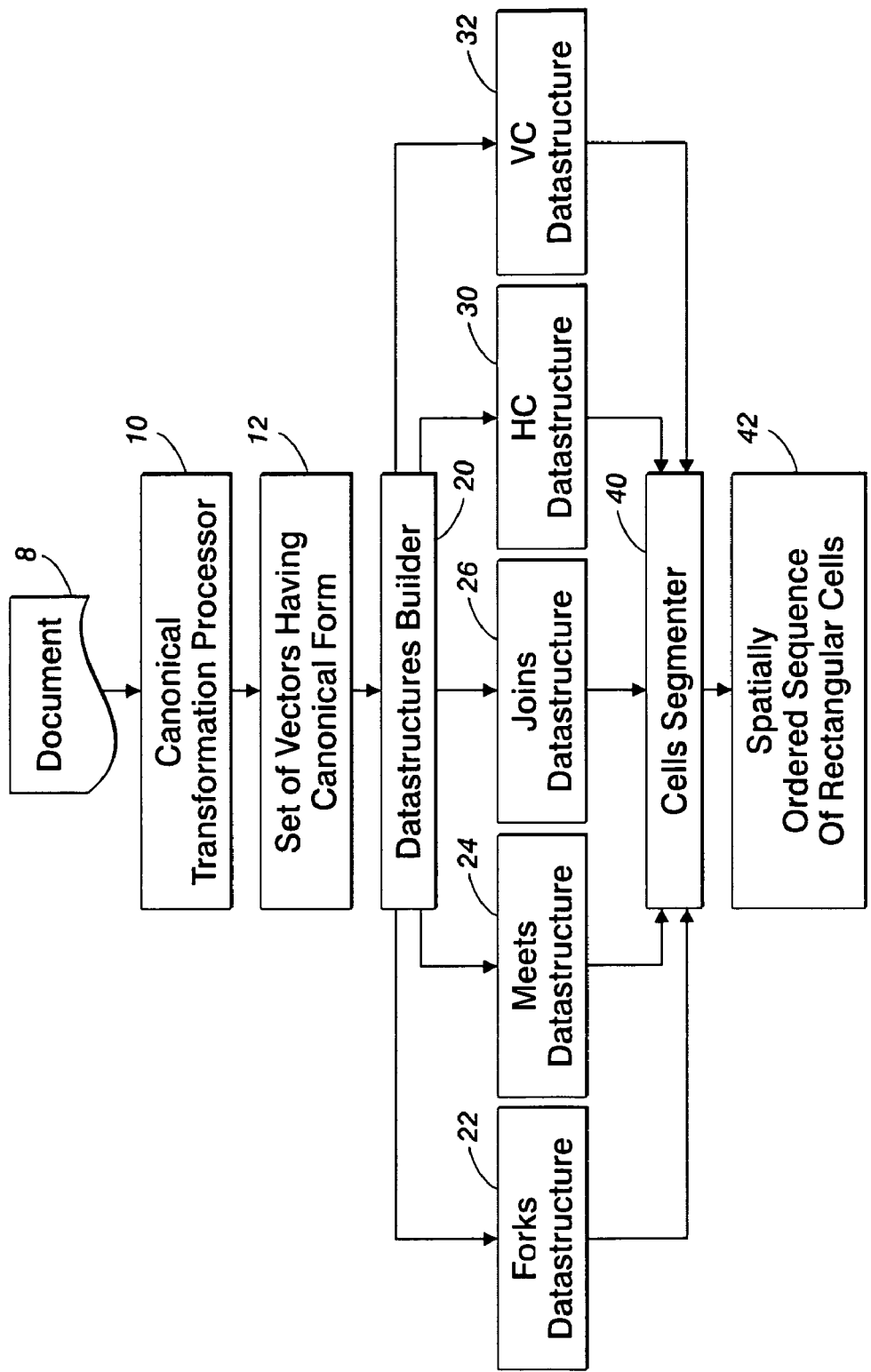
FIG. 1 diagrammatically shows a system for identifying cells of a table that is delineated by gridlines.

To facilitate setting forth the example embodiments, an example page description language (PDL) employing a vector-based line graphical language is described and employed herein to illustrate various example embodiments. The skilled artisan can readily adapt the example PDL employed herein to implement such embodiments in other formats such as portable document format (PDF), PostScript, scalable vector graphics (SVG), or so forth which employ vector-based graphical representations. The example PDL includes a linear plane for representing line graphics such as gridlines of a table. The PDL can be more complex. For example a more complex PDL including multiple planes with continuous X and Y coordinates, an abstract color model using three continuous red, green, and blue planes, graphical objects including text, lines, polylines, filled rectangles, filled polygons, clipping areas, coordinate transformations, and so forth is described in Vion-Dury, U.S. application Ser. No. 11/312,267 filed Dec. 20, 2005, entitled "Normalization of Vector-Based Graphical Representations" which is incorporated herein by reference in its entirety.

In the example PDL used herein, a discrete line graphical plane is defined with X-Y orthogonal axes, in which the X-coordinate is horizontal and oriented from left to right, and the Y-coordinate is vertical and oriented from top to bottom. In other embodiments, the X and Y coordinates may be reversed, or otherwise labeled coordinates may be used, or another coordinate system may be selected. Coordinates for vectors are mathematically expressed using relative integers. To facilitate conversion of graphical content into a unique canonical representation, a spatial or lexicographic ordering of starting and ending points for the vectors is defined. Substantially any lexicographic ordering can be defined or selected as long as it is used consistently. In the examples herein, the following example lexicographic ordering of points is selected: a point $p_1$ is less than a point $p_2$ if (i) the x-coordinate of $p_1$ is strictly smaller than the x-coordinate of $p_2$ or (ii) the points $p_1$ and $p_2$ have the same x-coordinate and the y-coordinate of $p_1$ is strictly smaller than the y-coordinate of $p_2$. Mathematically, this can be written as:

$$p_1 \Leftrightarrow (p_1.x<p_2.x) \vee (p_1.x=p_2.x \wedge p_1.y<p_2.y) \quad (1)$$

Using the spatial or lexicographic ordering of Equation (1), points are ordered primarily based on the horizontal x-coordinate, and secondarily based on the vertical y-coordinate. More generally, the notation .x and .y can be replaced by .α and .β, respectively, where α and β denote two mutually orthogonal coordinate directions used for specifying the points $p_1$ and $p_2$. This order can be shown to be total, irreflexive, asymmetric and transitive.

A vector or line segment (these terms being used interchangeably herein) is defined in the example lexicographic ordering by an oriented pair of points including: the starting point; the ending point; and other optional attributes such as line type (e.g., solid, dashed, dotted, or so forth), color c, line width w, or so forth. A well-formed line segment s having a given color c and line width w is thus given by s=<$p_1, p_2$, c, w>, for example, where $p_1 < p_2$. In the following, line attributes are not considered; hence, the line segment s may be written more simply as s=<$p_1, p_2$>. Line segments are ordered in the example lexicographic ordering as:

$$<p_1 p_2> < <p_3, p_4> \Leftrightarrow (p_1 < p_3) \vee (p_1 = p_3 \wedge (p_2 < p_4)) \quad (2)$$

Using the lexicographic ordering of Equation (2), the line segments are spatially ordered respective to coordinates of the starting and ending points. If line attributes such as color, width, type, or so forth are also provided, these can either be not considered in the table analysis (this assumes that the line attributes are not significant respective to gridlines of a table, which is a reasonable assumption for some tables) or can be used as secondary ordering criteria. In the following, it is assumed that line attributes are either not present or are not considered in the table analysis.

The lexicographic ordering set forth in Equations (1) and (2) and related text is an example. Other lexicographic orderings can be used. For example, the ordering of points can be by y-coordinate first, then by x-coordinate if the y-coordinates of two points are equal. The canonical vector-based representation is unique for given visual line graphical content regardless of the vector representation of the graphical content input to the defined canonical transformation algorithm. The canonical representation advantageously is not a dot-matrix representation, but rather retains a tractable vector-based abstraction level and does not inherently degrade resolution, although optionally the canonical transformation algorithm can incorporate a selected resolution or spatial granularity which can produce more compact or efficient canonical representations at the cost of being at the selected resolution or granularity. Based on the examples herein, the skilled artisan can readily construct various canonical transformation algorithms producing unique vectors (for that canonical transform algorithm) having a canonical form without vector overlaps or crossings.

With reference to FIG. 1, a document 8 is assumed to be in a format employing vector-based line graphics represented as vectors using the example PDL set forth herein. Documents in which line graphics are represented in a non-vector format, such as bitmapped documents, are optionally converted to produce the document 8 by a suitable converter program. A canonical transformation processor 10 converts the vector-based linear graphical content of the document 8 into a unique vector-based canonical form. The canonical transformation processor 10 receives as input linear graphical content of the document 8 including a graphical description generated (in the examples shown herein) in conformance with the example PDL, as well as optional pixel geometry information (such as W and H values indicating the width and height of a pixel, respectively). Vectors or line segments of the document 8 are ordered in accordance with Equation (2) or another selected lexicographic ordering.

Figure 3:
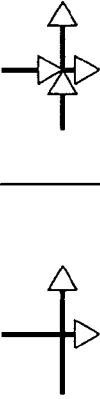
FIG. 3 diagrammatically shows suitable adjustments performed by the vectors converter of FIG. 1 for removing line segment crossings.

With continuing reference to FIG. 1 and with further reference to FIGS. 2 and 3, the canonical transformation processor 10 processes the ordered line segments of the document 8 to remove redundancies, overlaps, and crossings of line segments. In the case of overlapping segments, FIG. 2 illustrates suitable adjustments that are applicable when two parallel line segments designated $s_i=<p_1,p_2>$ and $s_j=<p_3,p_4>$, respectively, are partially overlapping or wholly overlapping (that is, where one line is contained by another line). For example, if the ordering of the line segment points is such that $p_1 \triangleleft p_3 \triangleleft p_2 \triangleleft p_4$, then a suitable adjustment is to shorten line segment $s_i$ by replacing its end point $p_2$ with point $p_3$ thus eliminating the overlap. If the ordering of the line segment points is such that $p_1 \cong p_3 \triangleleft p_2 \triangleleft p_4$, then a suitable adjustment is to shorten line segment $s_j$ by replacing its starting point $p_3$ with point $p_2$ thus eliminating the overlap. If the ordering of the line segment points is such that $p_1 \triangleleft p_3 \triangleleft p_4 \triangleleft p_2$ (line segment $s_j$ contained by line segment $s_i$), then a suitable adjustment is to shorten line segment $s_i$ by replacing its end point $p_2$ with point $p_3$ to uncover line segment $s_j$ and to add a third line segment $<p_4,p_2>$ to span the portion of original line segment $s_i$ not covered by either the shortened line segment $s_i$ or line segment $s_j$. If the ordering of the line segment points is such that $p_1 \cong p_3 \triangleleft p_4 \triangleleft p_2$ (line segment $s_j$ contained by line segment $s_i$), then a suitable adjustment is to replace the two line segments $s_i$ and $s_j$ by non-overlapping line segments $<p_1,p_4>$ and $<p_4,p_2>$. If the ordering of the line segment points is such that $p_1 \triangleleft p_3 \triangleleft p_4 \triangleleft p_2$ (line segment $s_j$ contained by line segment $s_i$), then a suitable adjustment is to shorten line segment $s_i$ by replacing its end point $p_2$ with point $p_3$ thus uncovering line segment $s_j$.

With reference to FIG. 3, the canonical transformation processor 10 also makes adjustments to remove crossings of non-parallel vectors or line segments. The line segment crossing is removed by replacing the crossed line segment or line segments by equivalent line segments having starting or end points at the crossing point. Still further, the line segments overlap removal processor 40 suitably removes line segments that are overlapped and covered up by other line segments.

It is assumed herein that table gridlines are horizontal and vertical lines, such as are shown in FIGS. 2 and 3. Accordingly, lines which are neither vertical nor horizontal are suitably not considered. In some embodiments, the canonical transformation processor 10 performs a filtering to remove vectors or line segments that are not horizontal and are not vertical, since table gridlines are typically horizontal or vertical. If there is a possibility that the graphics are skewed or rotated by a small angle respective to the X-Y coordinate system (for example, if they are produced from a scanned page in which the content of the original hardcopy sheet may have been skewed or rotated respective to the scanner coordinates system) then the transformation processor 10 optionally applies a rotational transform to remove the skew or rotation.

With continuing reference to FIG. 1 and with further reference to FIG. 4, the canonical transformation processor 10 also combines parallel adjacent segments to remove vector redundancies. As shown in FIG. 4, two horizontal line segments $<p_1,p_2>$ and $<p_3,p_4>$ are parallel and have substantially the same color and substantially common width. Moreover, the ending point $p_2$ of the first line segment is substantially the same as the starting point $p_3$ of the second line segment (that is, $p_2 \cong p_3$), and the joining point (that is, $p_2 \cong p_3$) is not the location of a crossing, starting, or ending of a third line segment. The combination of the two parallel line segments $<p_1,p_2>$ and $<p_3,p_4>$ is therefore not unique, since the joining point (that is, $p_2 \cong p_3$) could be located anywhere between $p_1$ and $p_4$. Accordingly, to ensure a unique canonical graphical representation the two parallel adjacent segments are suitably replaced by a single unique line segment $<p_1,p_4>$ that spans the same length as the original two fragmented horizontal line segments. Similar processing is performed to remove vector redundancies in joining vertical segments.

With continuing reference to FIG. 1, in some embodiments the canonical transformation processor 10 suitably operates iteratively. After an initial pass in which line crossings, overlaps, and parallel redundancies are removed, the canonical transformation processor 10 checks whether the line graphics are now in canonical form. If overlaps, crossings, or parallel redundancies remain, then another iteration of processing is performed, and the canonical transformation processor 10 is iteratively applied until an ordered set of vectors 12 having canonical form without vector overlaps, crossings, or redundancies and ordered in accordance with Equation (2) is achieved.

The set of canonical vectors 12 is used in delineating cells of a table. In general, a rectangular cell will have an upper-left corner point that is the common starting point of a horizontal canonical vector and a vertical canonical vector, and will also have a lower-right corner point that is the common ending point of a horizontal canonical vector and a vertical canonical vector. Thus, a cell is represented by a pair of points $<p_1, p_2>$ where $p_1$ and $p_2$ denote the upper left and lower right corners of the cell, respectively. Cells are ordered similarly to line segments, based on the points $p_1$ and $p_2$, as follows:

$$\langle p_1,p_2 \rangle \prec \langle p_3,p_4 \rangle \Leftrightarrow (p_1 \prec p_3) \vee (p_1 = p_3 \wedge (p_2 \prec p_4)) \quad (3)$$

Equation (3) is formally identical with Equation (2); however, Equation (3) applies to cells, whereas Equation (2) applies to vectors or line segments. Additional joining vectors may be included in defining one or more horizontal or vertical delineating boundaries of the cell. A datastructures builder 20 determines various vector connections of interest, such as vector forks, vector meets, vector joins, and sets of joining horizontal or vertical vectors.

With continuing reference to FIG. 1 and with further reference to FIGS. 5, 6, 7, 8, and 9, several example datastructures are set forth in turn. For example, the datastructures builder 20 determines forks datastructures 22. As shown in example FIG. 5, each forks datastructure identifies all vectors that have a common starting point with a vector of interest. Hence, the datastructure Forks(s) denotes the set of vectors (possibly an empty set) that have a common starting point with the vector s. In example FIG. 5, Forks(s)=[$s_1$] since vectors s and $s_1$ have a common starting point. Mathematically, the Forks(s) datastructure for a vector $s=\langle p_1,p_2\rangle$ is the ordered sub-set of all other vectors in the set of canonical vectors 12 having the form $\langle p_1,p_i\rangle$ where $p_i$ can be any end point other than $p_2$ satisfying the condition $p_1 \prec p_i$.

With reference to FIGS. 1 and 6, the example datastructures builder 20 also determines meets datastructures 24. As shown in example FIG. 6, each meets datastructure identifies all vectors that have a common ending point (i.e, meet) with a vector of interest. Hence, the datastructure Meets(s) denotes the ordered set of vectors (possibly an empty set) that have a common ending point with the vector s. In example FIG. 6, Meets(s)=[$s_1$] since vectors s and $s_1$ have a common ending point. Mathematically, the Meets(s) datastructure for a vector $s=\langle p_1,p_2\rangle$ is the sub-set of all other vectors in the set of canonical vectors 12 having the form $\langle p_i,p_2\rangle$ where $p_i$ can be any starting point other than $p_1$ satisfying the condition $p_i \prec p_2$.

Figure 7:
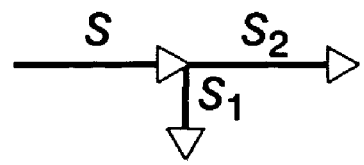
FIG. 7 diagrammatically shows vectors s, $s_1$, and $s_2$ associated with a datastructure Joins(s)=$[s_1,s_2]$.

With reference to FIGS. 1 and 7, the example datastructures builder 20 also determines joins datastructures 26. As shown in example FIG. 7, each joins datastructure identifies all vectors having a starting point in common with (i.e, joining) the ending point of a vector of interest. Hence, the datastructure Joins(s) denotes the ordered set of vectors (possibly an empty set) that have a starting point that coincides with the ending point of the vector s. In example FIG. 7, Joins(s)=[$s_1$, $s_2$] since vectors $s_1$, and $s_2$ each have a starting point joining the ending point of the vector s. Mathematically, the Joins(s) datastructure for a vector $s=\langle p_1,p_2\rangle$ is the sub-set of all other vectors in the set of canonical vectors 12 having the form $\langle p_2,p_i\rangle$ where $p_i$ can be any ending point satisfying the condition $p_2 \prec p_i$.

In each of the datastructures 22, 24, 26, it is to be understood that the common starting point (in the case of forks), common ending point (in the case of meets), or common joining point (in the case of joins) may in some embodiments require precise mathematical identity, or in other embodiments may allow for some coarseness in the resolution. As an example of the latter case, a vector $\langle p_3,p_4\rangle$ may be determined to fork from vector $\langle p_1,p_2\rangle$ (that is, have a common starting point) if $p_3$ is within a certain small distance from $p_1$ (that is, $p_1 \equiv p_3$), whereas in the former case exact identity (that is, $p_1 = p_3$ exactly) is required.

Figure 8:
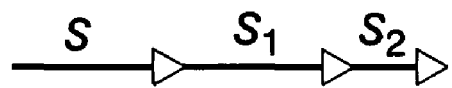
FIG. 8 diagrammatically shows vectors s, $s_1$, and $s_2$ of a datastructure HC(s)=$[s,s_1,s_2]$ (or equivalently, HCS($s_2$)=$[s_2, s_1,s]$).

With reference to FIGS. 1 and 8, the example datastructures builder 20 also determines horizontal continuity (HC) datastructures 30. As shown in example FIG. 8, each HC datastructure identifies a ordered set (or a sequence) of horizontal vectors s, $s_1$, $s_2$, . . . in which each subsequent vector joins the previous vector in the sequence. Mathematically, the datastructure HC(s) denotes the ordered set of horizontal vectors $s=\langle p_1,p_2\rangle$, $s_1=\langle p_2,p_3\rangle$, $s_2=\langle p_3,p_4\rangle$, . . . where $p_1 \prec p_2 \prec p_3 \prec p_4$ . . . . In the formalism used herein, the datastructure HC(s) contains at least the horizontal vector s, although it is also contemplated to employ analogous horizontal continuity datastructures that do not contain the input horizontal vector s. In example FIG. 8, HC(s)=[$s,s_1,s_2$] since vector $s_1$ is a horizontal vector joining horizontal vector s and vector $s_2$ is a horizontal vector joining horizontal vector $s_1$. Optionally, a corresponding symmetrical datastructure HCS is defined to denote the reverse sequence of horizontal joining vectors, that is, HCS($s_2$)=[$s_2,s_1,s$]. The symmetry relation:

$$\forall s, \forall s_i, s_i \in HC(s) \Leftrightarrow s \square HCS(s_i) \quad (4)$$

holds for the symmetrical HC and HCS datastructures.

Figure 9:
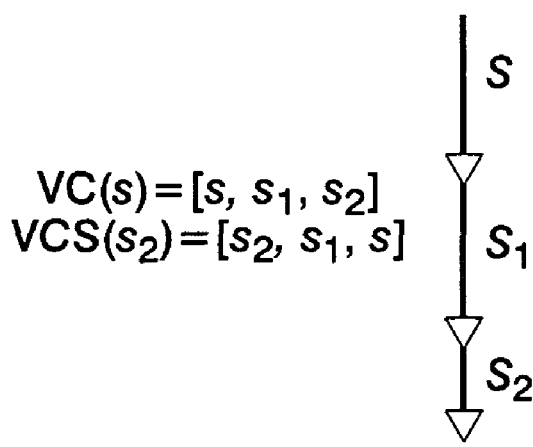
FIG. 9 diagrammatically shows vectors s, $s_1$, and $s_2$ of a datastructure VC(s)=$[s,s_1,s_2]$ (or equivalently, VCS($s_2$)=$[s_2, s_1,s]$).

With reference to FIGS. 1 and 9, the example datastructures builder 20 also determines vertical continuity (VC) datastructures 32. As shown in example FIG. 9, each VC datastructure identifies an ordered set (or a sequence) of vertical vectors s, $s_1$, $s_2$, . . . in which each subsequent vector joins the previous vector in the sequence. Mathematically, the datastructure VC(s) denotes the sequence of vertical vectors $s=\langle p_1,p_2\rangle$, $s_1=\langle p_2,p_3\rangle$, $s_2=\langle p_3,p_4\rangle$, . . . where $p_1 \prec p_2 \prec p_3 \prec p_4$ . . . . In the formalism used herein, the datastructure VC(s) contains at least the vertical vector s, although it is also contemplated to employ analogous vertical continuity datastructures that do not contain the input vertical vector S. In example FIG. 9, VC(s)=[$s,s_1,s_2$] since vector $s_1$ is a vertical vector joining vertical vector s and vector $s_2$ is a vertical vector joining vertical vector $s_1$. Optionally, a corresponding symmetrical datastructure VCS is defined to denote the reverse sequence of vertical joining vectors, that is, VCS($s_2$)=[$s_2,s_1,s$]. The symmetry relation:

$$\forall s, \forall s_i, s_i \in VC(s) \Leftrightarrow s \in VCS(s_i) \quad (5)$$

holds for the symmetrical VC and VCS datastructures.

The vector connection datastructures 22, 24, 26, 30, 32 can be created and stored in various ways. In some embodiments, the datastructures 22, 24, 26, 30, 32 are stored as hash tables, arrays, lists, or so forth. In some embodiments, the datastructures builder 20 builds the datastructures 22, 24, 26, 30, 32 as follows. Each of the Forks, Meets, and Joins datastructures 22, 24, 26 are built as hash tables using a single pass through the set of canonical vectors 12. For example, the following algorithm (denoted Algorithm #1 herein) suitably constructs the Forks(s), Meets(s), and Joins(s) datastructures:

---

(i) for each consecutive pair of vectors $s_i = \langle p_1,p_2\rangle$ and $s_j = \langle p_3,p_4\rangle$ in the ordered list of canonical vectors 12 -
   a. if $p_1 = p_3$ then update Forks($s_i$) with $s_j$
   b. else if $p_2 = p_3$ then update Joins($s_i$) with $s_j$
   c. else if $p_2 = p_4$ then update Meets($s_j$) with $s_i$

---

The relative simplicity of the above Algorithm #1 is due to the strong properties of the set of canonical vectors 12 which does not include any overlapping, crossing, or redundant vectors.

Once the Forks, Meets, and Joins datastructures 22, 24, 26 are generated, the HC and VC datastructures 30, 32 are suitably constructed using the following algorithm (denoted Algorithm #2 herein):

```
(i)  for each horizontal vector s in the set of canonical vectors 12 -
     a. initialize HC(s) 30 and HCS(s) with the vector s;
(ii) for each vertical vector s in the set of canonical vectors 12 -
     a. initialize VC(s) 32 and VCS(s) with the vector s;
(iii) for each vector s_i in the set of canonical vectors 12 -
     a. for each vector s_j in joins(s_i) -
         i.  if s_j is horizontal then update HCS(s_j) with HCS(s_i) then
             for each vector s_k in HCS(s_j) update HC(s_k) 30 with s_i
         ii. if s_j is vertical then update VCS(s_j) with VCS(s_i) then
             for each vector s_k in VCS(s_j) update VC(s_k) 32 with s_i
``` which uses the optional symmetric datastructures HCS and VCS to populate the respective direct datastructures HC 30 and VC 32.

The example datastructures 22, 24, 26, 30, 32 constructed using Algorithms #1 and #2 for a set of canonical vectors 12 containing only horizontal and vertical vectors have certain properties, such as:

(P1) segment sequences returned by hash tables are ordered accordance with the lexicographic ordering of segments in the plane;

(P2a) if s is a vertical segment, then VC(s) returns a sequence which first element is s;

(P2b) if s is not a horizontal segment, then HC(s) returns an empty sequence;

(P2c) if s is a vertical segment, then Forks(s) returns 0 or 1 horizontal segment.

(P2d) if s is a vertical segment then Meets(s) returns 0 segments.

(P3a) if s is not a vertical segment, then VC(s) returns an empty sequence;

(P3b) if s is a horizontal segment, then HC(s) returns a sequence which first element is s;

(P3c) if s is a horizontal segment then Forks(s) return 0 segments.

(P3d) if s is a horizontal segment then Meets(s) returns 0 or 1 vertical segment.

(P4) the relations Joins, Forks, Meets are disjoint—e.g. x in Joins(y) implies ¬x in Forks(y); and (P5) the relations Joins, Forks, Meets are irreflexive—e.g. ¬x in Joins(x).

These properties should be observed after applying successively the Algorithm #1 on the ordered set of canonical vectors 12.

With continuing reference to FIG. 1, the datastructures 22, 24, 26, 30, 32 are referenced by a cells segmenter 40 to identify a sub-set of the set of vectors 12 defining a rectangle delineating a cell. The sub-set of vectors includes at least: (i) two vectors having common starting points (suitably identified by referencing the Forks datastructure 22); and (ii) two vectors having common ending points (suitably identified by referencing the Meets datastructure 24). Thus, each cell is delineated by at least four vectors (namely, two forking vectors and two meeting vectors). However, additional connecting vectors may be included in the cell-delineating rectangle. More generally, the cells segmenter 40 identifies a cell delineated by a set of vector chains including at least forking first horizontal and vertical vector chains, a second horizontal vector chain joining a vector of the first vertical vector chain, and a second vertical vector chain joining a vector of the first horizontal vector chain, in which the second horizontal and second vertical vector chains including meeting horizontal and vertical vectors. Each of the vector chains delineating the cell includes at least one vector.

Figure 10:
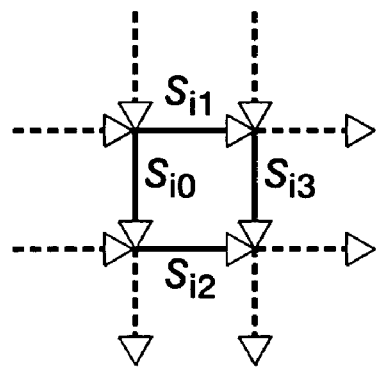
FIG. 10 diagrammatically shows an illustrative example rectangular cell delineated by a pair of forking vectors and a pair of meeting vectors.

With reference to FIG. 10, an example is shown in which exactly four vectors, namely two forking vectors $s_{i0}$ and $s_{j1}$ having common starting points and two meeting vectors $s_{i2}$ and $s_{j3}$ having common ending points, define a rectangular cell. The subscript notation i0, i1, i2, i3 indicates the index ordering of the vectors in the canonical form, and for the rectangular cell of FIG. 10 follows the relationship: $i1=i0+1$; $i2=i1+1$; and $i3=i2+m$ where $m>1$. For the cell of FIG. 10, the four vector chains delineating the cell each include a single vector.

Figure 11:
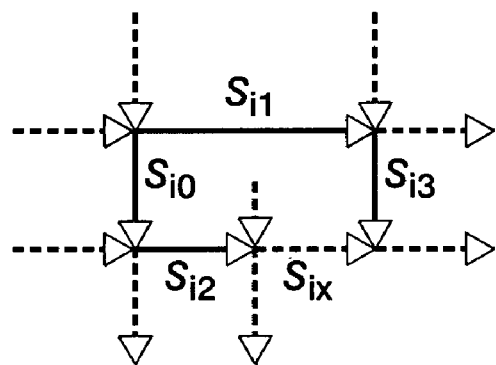
FIG. 11 diagrammatically shows an illustrative example rectangular cell delineated by a pair of forking vectors, a pair of meeting vectors, and an additional horizontal vector.
Figure 12:
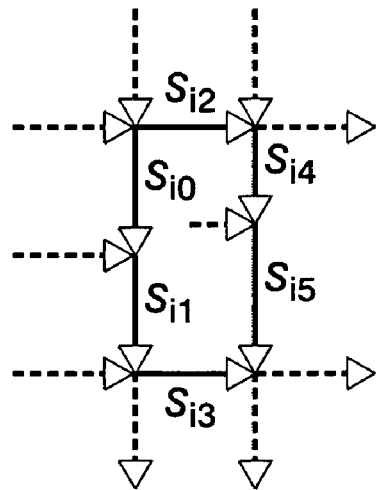
FIG. 12 diagrammatically shows an illustrative example rectangular cell delineated by a pair of forking vectors, a pair of meeting vectors, and two additional vertical vectors.

With reference to FIGS. 11 and 12, two other examples of rectangular cells are shown. Each of these rectangular cells is defined by five or more vectors including (i,ii) two forking vectors, (iii,iv) two meeting vectors, and (v) at least one additional vector that is additional to the forking horizontal and vertical vectors and the meeting horizontal and vertical vectors. In FIG. 11, a rectangular cell is delineated by five vectors denoted $S_{i0}$, $s_{i1}$, $s_{i2}$, $s_{j2}$, $s_{i3}$, $s_{ix}$, and the canonical indices i0, i1, i2, i3 follow the relationships: $i1=i0+1$; $i2=i1+1$; and $i3=i2+m$ where $m>1$. In FIG. 12, a rectangular cell is delineated by six vectors denoted $s_{i0}$, $s_{i1}$, $s_{i2}$, $s_{i3}$, $s_{i4}$, $s_{i5}$, and the canonical indices i0, i1, i2, i3, i4, i5 follow the relationships: $i1=i0+1$; $i2=i1+m$; $i3=i2+1$; $i4=i3+n$; $i5=i4+1$; where $m>1$ and $n>1$.

With returning reference to FIG. 1, in one example embodiment the cells segmenter 40 identifies minimal rectangular cells of a table (that is, rectangular cells that do not contain other rectangular cells) using the following example algorithm denoted Algorithm #3 herein:

```
1.  for all vertical segments s_0 = < p_{o1} p_{o2} >
2.    for all segments s_1 in forks(s_0)
3.      for all segments s_h in HC(s_1)
4.        for all segments s_v in VC(s_0)
5.          if joins(s_v) = [s_{v v'} ... s_{h'}] then
6.            for all segments s_{vh} = < p_{h1} p_{h2} > in HC(s_{h'})
7.              if joins(s_h) = [s_{v'} ...] then
8.                for all segments s_{hv} in VC(s_{v'})
9.                  if s_{hv} in meets(s_{vh}) then
10.                   append cell(p_{o1}, p_{h2}) in result list ;
11.                   continue the loop 1. starting from
12.                     s_{v v'} if vertical(s_{v v'})
13.                     s_v otherwise
```

Figure 13:
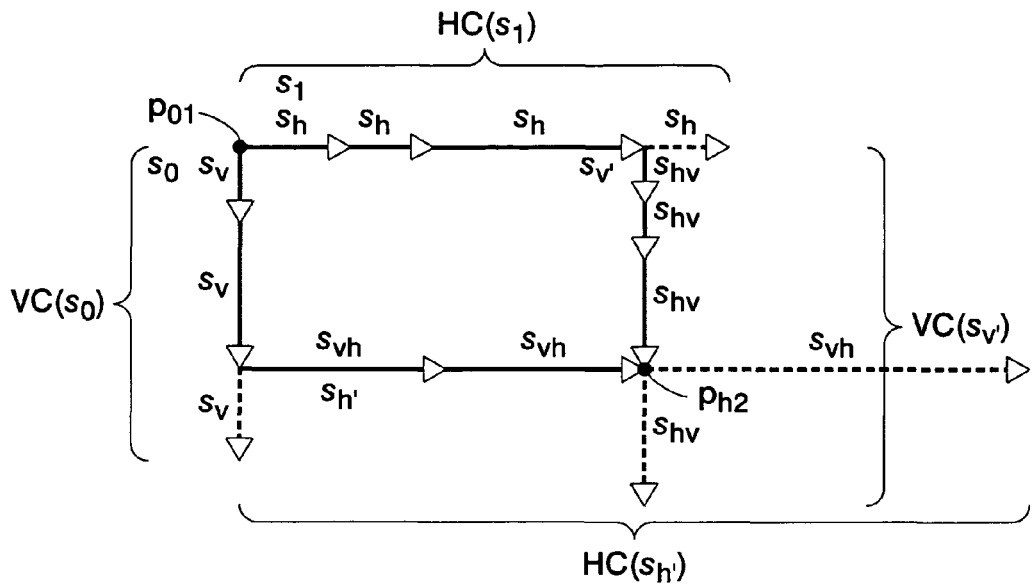
FIG. 13 diagrammatically shows vectors and datastructures involved in identifying vectors comprising a rectangular cell.

FIG. 13 diagrammatically shows the vectors and vector chains involved in Algorithm #3. The first loop of Algorithm #3 scans the input sequence of vectors 12 in order, selecting all vertical segments forking some other segments $s_1$. Only those $s_1$ vectors which are horizontal are considered (see line 5 of Algorithm #3), since otherwise HC($s_1$) would be empty (see property P2b given previously). The same remark holds for segments $s_h$, and $s_v$, with respectively HC and VC (see properties P2b, P3a given previously). When iterating, the first value taken by $s_v$ is $s_0$ and the first value taken by $s_h$ is $s_1$ (see properties P2a, P3b), and this ensures that minimal rectangles defining minimal cells are captured. Matching patterns are found and appended to the result list (see line 10 of Algorithm #3). If segments are exclusively either vertical or horizontal (for example, if the canonical transformation processor 10 filters out non-vertical and non-horizontal lines), then some optimizations can be obtained using properties of joins and meets (see properties P2c, P2d, P3c, P3d given previously). Lines 11-13 of Algorithm #3 step over the following starting segment, thus searching for the next top-left corner rather than exploring all overlapping rectangles for that corner.

With reference to FIG. 1, the output of the cells segmenter 40 is a spatially ordered sequence of rectangular cells 42 representing a table. Each cell in the sequence is suitably denoted by an ordered pair of points $<p_{ul}, p_{lr}>$ in which $p_{ul}$ and $p_{lr}$ are the upper left and lower right corner points of the rectangular cell, respectively. The spatially ordered sequence of rectangular cells 42 is spatially ordered in accordance with the lexicographical ordering of Equation (3).

The datastructures builder 20 and cells segmenter 40 described herein are illustrative examples. Other cell segmentation algorithms are set forth in Vion-Dury, U.S. application Ser. No. 11/451,525 filed Jun. 12, 2006, entitled "Methods and Apparatuses for Finding Rectangles and Application to Segmentation of Grid-Shaped Tables" which is incorporated herein by reference in its entirety, and which describes algorithms for finding minimal cells only, and also for finding both minimal and non-minimal cells. Moreover, other algorithms are contemplated for extracting the spatially ordered sequence of rectangular cells 42 that is ordered in accordance with Equation (3). In some such contemplated embodiments, extraction of the canonical graphical representation 12 is omitted, and cells are identified by another approach such as (i) filtering out all but horizontal and vertical lines, (ii) identifying minimal cells as closed loop paths of horizontal and vertical lines, (iii) identifying the upper left corner point $p_{ul}$ and the lower right corner point $p_{lr}$ of each closed loop path as a cell representation $<p_{ul}, p_{lr}>$; and (iv) ordering the cell representations $<p_{ul}, p_{lr}>$ in accordance with Equation (3).

However it is derived, the spatially ordered sequence of rectangular cells 42 does not readily provide information on the logical ordering of the cells within the table. For example, the lexicographic ordering of Equation (3) does not readily delineate which cells define a row, or a column, or other structure of the table. Identification of rows, columns, and other structural elements of the table is advantageous for extracting logical or semantic information.

Figure 14:
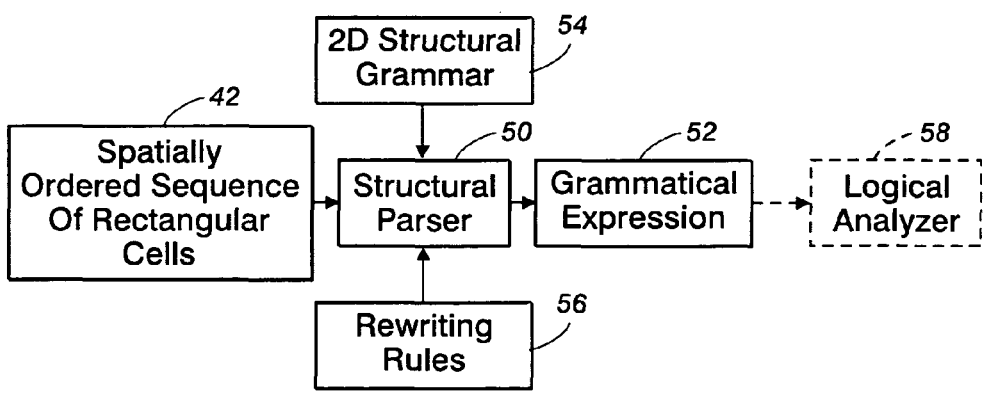
FIG. 14 diagrammatically shows a system for operating on a spatially ordered sequence of rectangular cells to determine a table structure.

Accordingly, with reference to FIG. 14 a structural parser 50 operates on the spatially ordered sequence of rectangular cells 42 to construct a grammatical expression 52 embodying structural relationships of the cells respective to one another. The approach implemented using the structural parser 50 adapts existing parsing techniques typically applied to identify grammatical relationships between tokens (e.g., words) of a sentence, paragraph, or other natural language input. Analogously, the structural parser 50 references a grammar, in this case a two-dimensional structural grammar 54, that has terminal elements corresponding to cells and non-terminal elements corresponding to structural relationship operators. The resulting grammatical expression 52 represents the cells using terminal elements and represents structural relationships by suitable non-terminal elements of the grammar 54. The structural parser 50 optionally also references a set of rewrite criterion/rewrite rule pairs 56, and applies a rewrite rule when the corresponding rewrite criterion is satisfied by at least a portion of the grammatical expression being parsed.

The resulting grammatical expression 52 is indicative of spatial positions of the rectangular cells relative to one another. Accordingly, the grammatical expression 52 is useful in identifying logical cell groupings such as table rows, table columns, and so forth. The structural identifications can be variously used. In FIG. 4, the grammatical expression 52 serves as input to a logical analyzer 58 that performs logical analysis of the contents of the cells based on the structure. For example, the logical analyzer 58 may provide a statistical summary of each column of the table, such as the largest, smallest, average, and/or other value characterizing numerical values contained in cells of the column.

Figure 16:
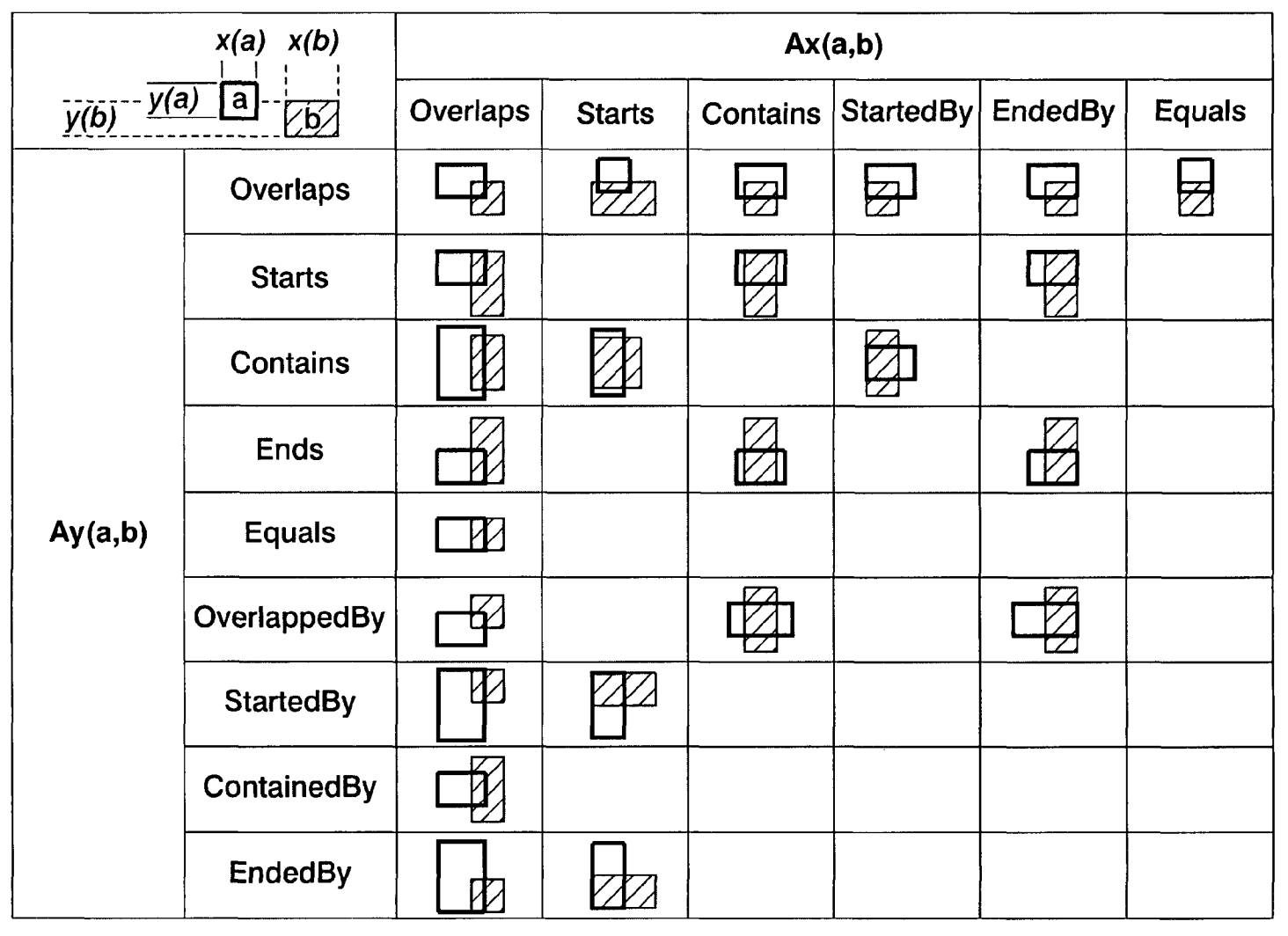

With reference to FIGS. 15 and 16, the non-terminal elements of the structural grammar 54 are suitably two-dimensional structural relationship operators. FIG. 15 shows one suitable set of such structural relationship operators. The operators of FIG. 15 are based on the one-dimensional Allen operators discussed for example in Allen, "Toward a General Theory of Action and Time", Artificial Intelligence vol. 23, pp. 123-54 (1984) and Allen, "Maintaining Knowledge about Temporal Intervals", Communications of the ACM vol. 26 no. 11, pp. 832-43 (1983) as extended to two-dimensional space as discussed for example in Aiello & Smeulders, "Thick 2D Relations for Document Understanding", University of Trento Technical Report # DIT-02-0063 (2002). Examples of these operators are shown graphically in FIG. 15 under the "Example" column, and are described semantically under the "Semantics" column of FIG. 15, where the operators in the semantic expressions are the one-dimensional Allen operators with superscripts "X" or "Y" denoting the X- or Y-coordinate, respectively, where the X-coordinate is horizontal running from left to right and the Y-coordinate is vertical running from top to bottom. The "abbreviation" column of the table of FIG. 15 indicates abbreviations for the two-dimensional structural relationship operators that are used herein (see particularly the rewrite rules set forth in FIGS. 20A, 20B, 21A, and 21B). FIG. 16 provides some examples of overlapping cells and their description using two-dimensional structural operators of FIG. 15. The "weakcontains" operator used in the semantic description of the Contains operator is defined as:

$$\text{weakContains}^\alpha(a,b) = \text{contains}^\alpha(a,b) \vee \text{starts}^\alpha(a,b) \vee \text{startedBy}^\alpha(a,b) \vee \text{equals}^\alpha(a,b) \quad (6),$$

where the superscript $\alpha$ generically denotes either the X- or Y-coordinate.

Figure 17:
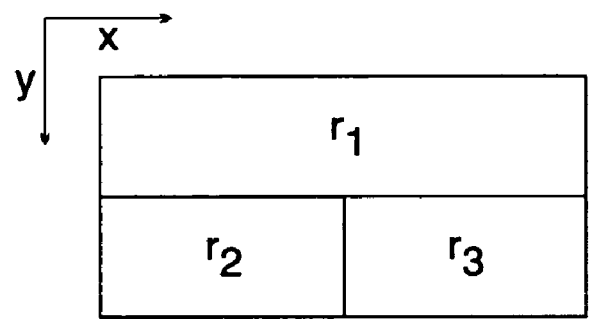
FIG. 17 illustrates an example three-cell arrangement.

With reference to FIG. 17, the two-dimensional structural relationship operators of FIGS. 15 and 16 can be combined in accordance with the structural grammar 54 to describe more complex arrangements of three or more rectangular cells. For example, FIG. 17 depicts three rectangular cells labeled $r_1$, $r_2$, and $r_3$, which satisfy the grammatical expression:

$$\text{AboveEq}(r_1, \text{LeftEq}(r_2, r_3)) \quad (7),$$

which can also be written as $$(r_1 \text{ AboveEq BoundingBox}(r_2, r_3))^\wedge (r_2 \text{ LeftEq } r_3) \quad (8),$$

where BoundingBox denotes the minimum rectangular box containing rectangular cells $r_2$ and $r_3$. For a set of rectangular cells $\{r_n\}$ where each rectangular cell is given by the set of upper-left and lower-right coordinates $<p_{ul,n}, p_{lr,n}>$, the expression BoundingBox($\{r_n\}$) is given by the upper-left and lower-right coordinates $<\min\{p_{ul,n}\}, \max\{p_{lr,n}\}>$ where $\min\{p_{ul,n}\}$ is the minimum upper-left coordinate of the set of rectangular cells $\{r_n\}$ and $\max\{p_{lr,n}\}$ is the maximum lower-right coordinate of the set of rectangular cells $\{r_n\}$.

In a suitable embodiment, the two-dimensional structural grammar 54 is a semantic relationship tree-type grammar given by:

$$S ::= A(S, S) | A(r, r) \quad (9),$$

where r denotes a terminal element indicative of a rectangular cell, and A denotes a non-terminal element selected from the set of the two-dimensional structural relationship operators, such as the example set {AboveLeft, AboveRight, AboveEq, LeftUpper, LeftBottom, LeftEq, Contains, Overlaps} set forth in FIGS. 15 and 16. The semantics of the semantic relationship grammar trees is formally defined through a notational function ζ that maps terms of the grammar of Equation (9) into logical clauses over the two-dimensional structural relationship operator set, as set forth in Table I,

TABLE 1

Semantics of Semantic Relationship Trees
Definition of ζ

| Term S | ζ(S) |
|---|---|
| $A(S_1, S_2)$ | $[BoundingBox(S_1) \wedge BoundingBox(S_2)] \hat{} \zeta(S_1) \hat{} \zeta(S_2)$ |
| $A(r, S_2)$ | $[r \wedge BoundingBox(S_2)] \hat{} \zeta(S_2)$ |
| $A(r_1, r_2)$ | $[r_1 \wedge r_2]$ | where the BoundingBox function is more precisely in Table II.

TABLE 2

BoundingBox Function
Definition of BoundingBox

| Term S | BoundingBox (S) |
|---|---|
| $A(\alpha_1, \alpha_2)$ with $\alpha_1, \alpha_2$ in $\{S, r\}$ | $<\min(p_1, p_3), \max(p_2, p_4)>$, if $BoundingBox(\alpha_1) = <p_1, p_2>$ and $BoundingBox(\alpha_2) = <p_3, p_4>$ |
| r | r |

Figure 18:
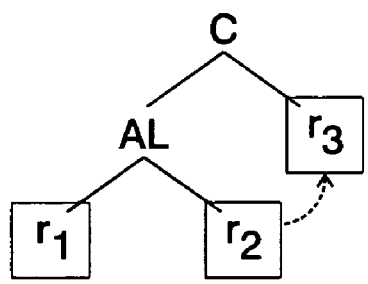
FIGS. 18 and 19 illustrate two example grammatical tree representations of the three-cell arrangement of FIG. 17.
Figure 19:
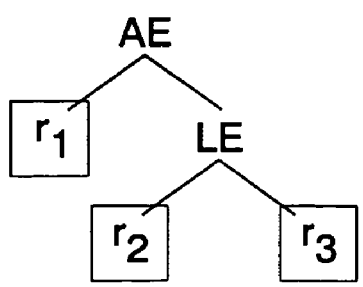
Figure 20B:
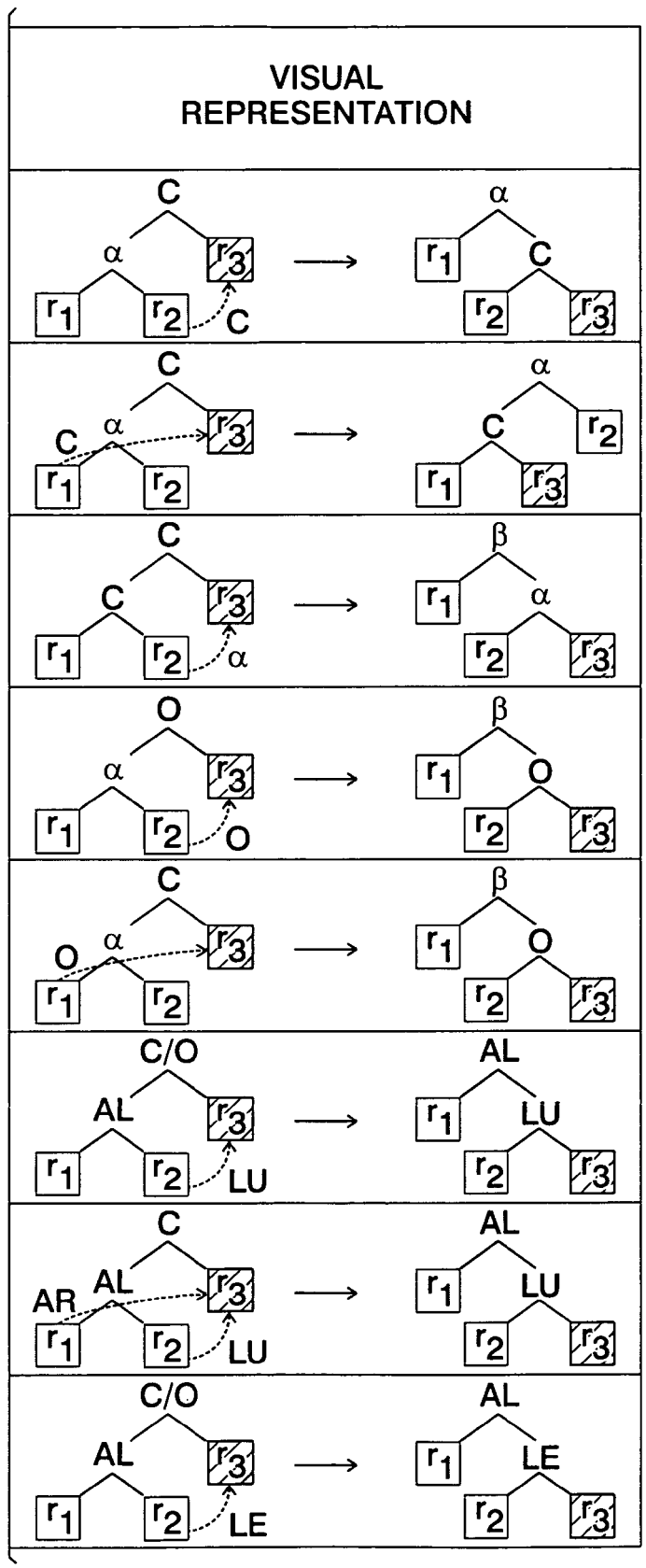
Figure 21B:
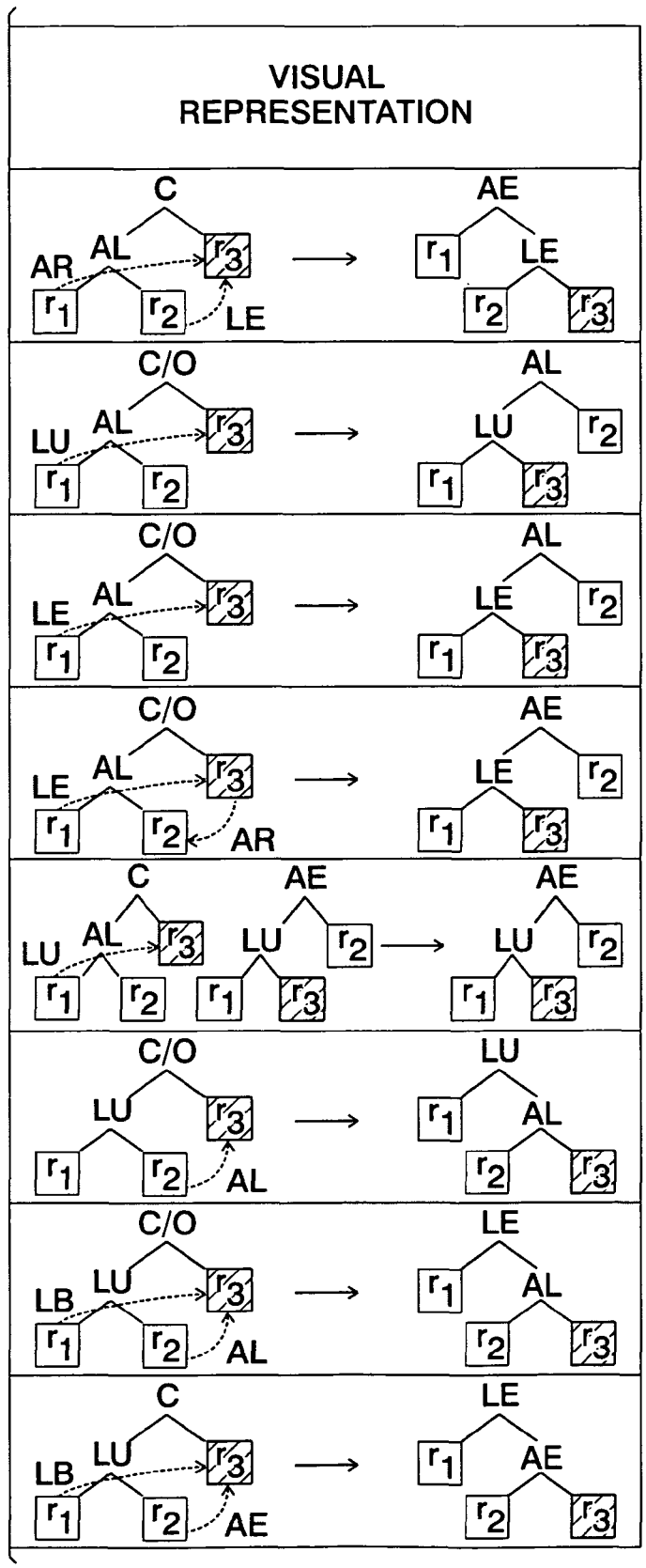

With reference to FIGS. 18 and 19, Equation (7) accurately describes the relative spatial relationships or structure of the three rectangular cells labeled $r_1$, $r_2$, and $r_3$ depicted in FIG. 17; however, the expression of Equation (7) is not unique. Another grammatically accurate description of the depicted three rectangular cells labeled $r_1$, $r_2$, and $r_3$ is given by:

$$Contains(AboveLeft(r_1, r_2), r_3) \hat{} LeftEq(r_2, r_3) \qquad (10)$$

It will be appreciated that the grammatical expression of Equation (10) is more complex than the grammatical expression of Equation (7). Moreover, the grammatical expression of Equation (10) includes a Contains operator, which typically complicates logical interpretation of the grammatical expression since (in this case) the area of cell $r_3$ is also included in (that is, contained in) the bounding box bounding cells $r_1$ and $r_2$. FIG. 18 denotes the expression of Equation (10) in a diagrammatic representation employing the abbreviations for the two-dimensional structural relationship operators set forth in FIG. 15. FIG. 19 denotes the less complex expression of Equation (7) using the same type of diagrammatic representation. The transition from the representation of Equation (10) shown in FIG. 18 to the representation of Equation (7) shown in FIG. 19 is an example of one suitable rewriting rule for rewriting structural grammatical expressions.

With reference to FIGS. 20A, 20B, 21A, and 21B, a set of rewriting rules are defined that is suitable for use as the rewriting rules 56 of FIG. 14. The set of rewriting rules listed in FIGS. 20A, 20B, 21A, and 21B are denoted herein as the Standard Structural Rewriting Rule Set. Rules categorized as gen3, gen4, and gen6 introduce a free variable β in the right hand of the rule. The free variable β is a relation to be found in order to apply the rule. The existential variable β is straightforward to determine, for example by using a branching algorithm that uses a constant and small number of processing operations.

The Standard Structural Rewriting Rule Set listed in FIGS. 20A, 20B, 21A, and 21B has been found to work well. However, other rewriting rule sets are also contemplated. It is advantageous for the final grammatical expression 52 to not have any Contains or Overlaps operators, and more generally to not have any two-dimensional structural relationship operators that represent cell crossings or containments. An operator representing a cell crossing or containment produces ambiguity in interpreting table contents located in the area of the crossing or containment, since such table content is not unambiguously associated with any single cell. Accordingly, in some embodiments the rewriting rules are selected such that when applied they remove as much as possible (possibly by cooperative application of multiple rewrite rules) crossing or containment structural relationship operators. For example, the rewrite rules of the Standard Structural Rewriting Rule Set can be applied in various combinations to remove any Contains or Overlaps operators from the final grammatical expression 52.

With returning reference to FIG. 14, the structural parser 50 receives the spatially ordered sequence of rectangular cells 42, and performs a suitable parsing algorithm in conjunction with the two-dimensional structural grammar 54 and the set of rewriting rules 56. The spatially ordered sequence of rectangular cells 42 is suitably denoted by the input sequence $\{c_1, c_2, c_3, \ldots, c_n\}$. An example algorithm, denoted Algorithm #4 herein, for processing the ordered sequence of rectangular cells 42 (denoted as input sequence $\{c_1, c_2, c_3, \ldots, c_n\}$) is as follows:

1. Build a semantic relation tree with cells $c_1$ and $c_2$:
   a. Find a structural relationship operator A such that $c_1 \wedge c_2$ is satisfied, initialize the parse tree as $A(c_1, c_2)$ and delete the cells $c_1, c_2$ from the input sequence, or
   b. If no structural relationship operator A exists such that $c_1 \wedge c_2$ is satisfied, then stop the parsing, with an indication that the ordered sequence of rectangular cells does not correspond to a recognizable table;
2. Terminate successfully if the input sequence is empty;
3. pop the next cell c out of the input sequence;
4. compute the bounding box bb of the parse tree;
5. Build a semantic relation tree with bb and c:
   a. Find a structural relationship operator A such that bb A c is satisfied, update the parse tree as A(bb, c) and delete the cell c from the input sequence, or
   b. If no structural relationship operator A exists such that bb A c is satisfied, then stop the parsing, with an indication that the ordered sequence of rectangular cells does not correspond to a recognizable table;
6. Apply as many time as possible the rewriting rules 56 to the parse tree where applicable, respecting the rule ordering constraints; and
7. loop to stage 2.

Using the Standard Structural Rewriting Rule Set given in FIGS. 20A, 20B, 21A, and 21B, the method of Algorithm #4 is believed to ensure termination when the input sequence satisfies the constraints (that is, the ordered layered rewrite system is terminating) and to recognize the types of tables typically found in technical reports, scientific papers, and other documents and literature.

The parse tree or grammatical expression 52 that is output by Algorithm #4 is suitably expressed in the positional grammar of Equation (9). To identify useful logical table structures such as rows or columns from the parse tree, it is useful to identify grammatical structures written in the grammar of Equation (9) that correspond with rows, columns, or recognizable logical table structures. For example, the table, column, row, and cell table structures are represented by grammatical expressions $g_1, g_2, \ldots g_7$ as follows using the positional grammar of Equation (9):

| | | |
|---|---|---|
| Table | ::= Cell \| Column \| Row | $(g_1, g_2, g_3)$ (11) |
| Column | ::= Table AboveEq Table | $(g_4)$ |
| Row | ::= Table LeftEq Table | $(g_5)$ |
| Cell | ::= cell \| cell Contains Table | $(g_6, g_7)$. |

From Equation (11), it is seen that a grammatical sequence of elements grouped by LeftEq operators represents a row, while a grammatical sequence of elements grouped by AboveEq operators represents a column. Note that a row or column does not necessarily extend across the entire width or height of the table. For example, the grammatical expressions of Equation (11) can be used to identify a column that extends only partway through the table. Such a partial column can correspond, for example to a portion of a table-length column that is split into two narrower columns. Such a partial column can also correspond, for example to portions of two adjacent table-length columns that are merged into a single wider column over a portion of the table height.

Figure 22:
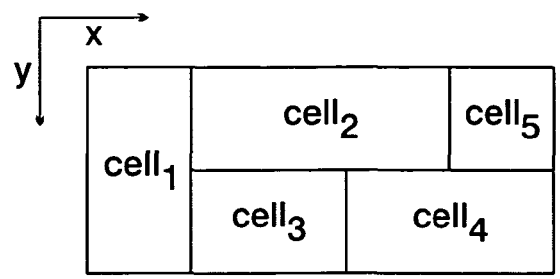
FIG. 22 illustrates an example five-cell table used to illustrate operation of the table structure determination system of FIG. 14.

With reference to FIG. 22, an example of processing performed by the system of FIG. 14 is described. Using equivalency operations defined in Equation (11), the table of FIG. 22 can be represented as follows:

| | |
|---|---|
| Table → Row | $(g_3)$ |
| → Table LeftEq Table | $(g_5)$ |
| → Cell LeftEq Table | $(g_1)$ |
| → cell$_1$ LeftEq Table | $(g_6)$ |
| → cell$_1$ LeftEq Row | $(g_2)$ |
| → cell$_1$ LeftEq (Table AboveEq Table) | $(g_5)$ |
| → cell$_1$ LeftEq (Row AboveEq Row) | $(g_3, g_3)$ |
| → cell$_1$ LeftEq ((Table LeftEq Table) AboveEq Row) | $(g_5, g_5)$ |
| → cell$_1$ LeftEq ((cell$_2$ LeftEq cell$_5$) AboveEq Row) | $(g_1, g_6, g_1, g_6)$ |
| → cell$_1$ LeftEq ((cell$_2$ LeftEq cell$_5$) AboveEq (Table LeftEq Table)) | $(g_5)$ |
| → cell$_1$ LeftEq ((cell$_2$ LeftEq cell$_5$) AboveEq (cell$_3$ LeftEq cell$_4$)) | $(g_1, g_6, g_1, g_6)$ |

This processing is purely generative, and demonstrates that the example table of FIG. 22 belongs to the set of tables described by Equation (11), since it can be generated in accordance with the grammar. However, recognizing the table is different from generating the table. The spatially ordered sequence of rectangular cells representing the table of FIG. 22 is: {cell$_1$, cell$_2$, cell$_3$, cell$_4$, cell$_5$}. Table recognition by automated processing of this ordered sequence using the parser 50 and the Algorithm #4 is as follows (where "stages" refer to numbered stages of Algorithm #4):

```
stage (1): build the SR-tree with the first two cells
    Result: AboveLeft(cell1,cell2)
stage (2, 3, 4, 5): pick cell3, build
    Result: Contains(AboveLeft(cell1,cell2),cell3)
stage (6): rewrite (rule b2)
    Result: LeftEq(cell1,AboveLeft(cell2,cell3) )
stage (2, 3, 4, 5): pick cell4, build
    Result: Contains(LeftEq(cell1,AboveLeft(cell2,cell3) ),cell4)
stage (6): rewrite (rules gen4, a3b)
    Result: LeftEq(cell1,AboveLeft(cell2, LeftEq(cell3,cell4)))
```

```
stage (2, 3, 4, 5): pick cell5, build
    Result: Contains(LeftEq(cell1,AboveLeft(cell2,
    LeftEq(cell3,cell4))),cell5)
stage (6): rewrite (rules gen1, a7)
    Result LeftEq(cell1,AboveEq(LeftEq(cell2,cell5),
    LeftEq(cell3,cell4)))
stage (6): successful end of parsing
``` which is the same result, but achieved in an automated manner.

Figure 23:
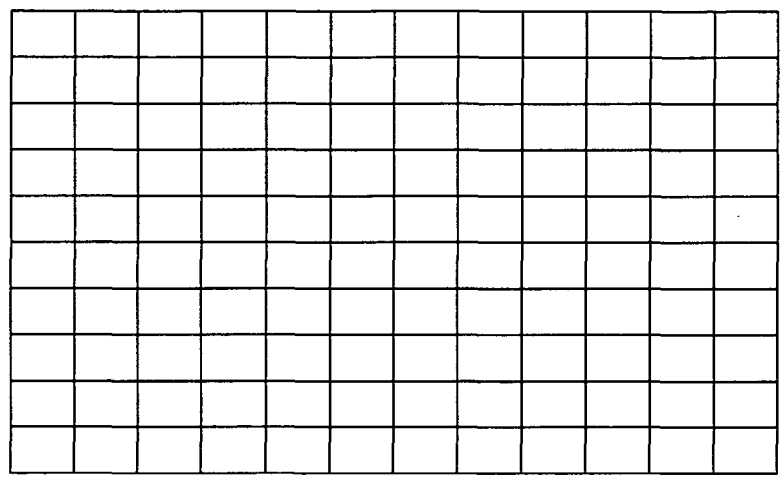
FIG. 23 shows a canonical grid-shaped table with equal-sized cells arranged in regular rows and columns defining a rectangular grid.
Figure 24:
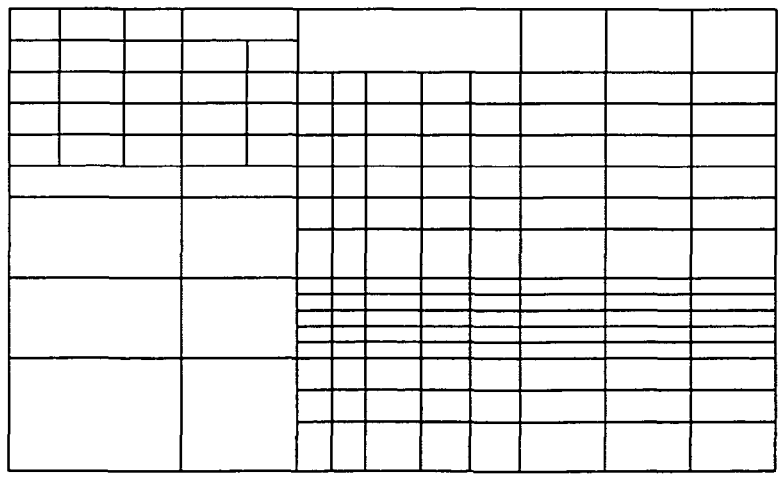
FIG. 24 shows a less regular table of about 150 cells.

With reference to FIGS. 23 and 24, a table structure analysis system was constructed in substantial accordance with the system of FIG. 14. The actually built system employed the two-dimensional structural relationship operators of FIGS. 15 and 16 and the Standard Structural Rewriting Rule Set of FIGS. 20A, 20B, 21A, and 21B. The Algorithm #4 was implemented in Python using a straightforward "naïve" translation with no optimization, using a leftmost innermost rewriting strategy, and was executed on a laptop with a 1.6 Ghz processor and 1 Gigabyte of memory. Canonical grid-shaped tables of the type shown in FIG. 23 were tested. By "canonical grid-shaped" it is meant that the table is comprised of equal-sized cells arranged in regular rows and columns defining a rectangular grid. Canonical grid-shaped tables with sizes ranging from 9 to 18 column/rows were tested. A less regular grid having about 150 cells, shown in FIG. 24, was also tested. Parsing execution times for the canonical grid-shaped tables ranged from about 0.09 seconds for an 81-cell grid to about 0.95 seconds for a 324-cell grid. The parsing time for the less regular table of FIG. 24 was around 0.3 seconds, and was comparable to the parsing time of 0.22 seconds for a 144-cell regular grid.

The disclosed table structure identification techniques can be implemented in various ways. In some embodiments, an apparatus includes one or more processors and other components such as the example illustrated parser 50 implemented as executable software running on one or more computers or other digital devices to implement one or more embodiments of the disclosed table structure identification techniques. In some embodiments, a storage medium such as an optical disk, magnetic disk, magnetic tape, FLASH memory, random access memory (RAM), read-only-memory (ROM), network server data storage, or so forth stores instructions executable to perform one or more embodiments of the disclosed table structure identification techniques. These are merely example physical implementations—other physical implementations are also contemplated.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A storage medium storing software that is executable on a computer or digital device to perform a method for determining a table structure, the method comprising:
    deriving a spatially ordered sequence of rectangular cells disposed in a two-dimensional region; and
    parsing the spatially ordered sequence of rectangular cells in accordance with a two-dimensional structural grammar having terminal elements corresponding to cells and non-terminal elements corresponding to structural relationship operators, the parsing producing a grammatical expression with the cells represented by terminal elements and structural relationships represented by non-terminal elements, wherein the grammatical expression is a table structure comprising a tree in which the cells are represented by leaf nodes of the tree and the structural relationships are represented by non-leaf nodes of the tree, and the parsing includes:

determining a table structure respective to a first two cells of a spatially ordered sequence of rectangular cells, the table structure including elements indicative of the first two cells and at least one element indicative of a structural relationship between the first two cells, defining a minimum rectangular bounding box containing the cells of the table structure, updating the table structure with additional structure including an element indicative of a next cell of the spatially ordered sequence of rectangular cells added as a leaf node and at least one element indicative of a structural relationship between the next cell and the minimum rectangular bounding box added as a non-leaf node, and repeating the defining and updating until the cells of the ordered sequence of rectangular cells are exhausted.

2. The storage medium as set forth in claim 1, wherein the updating further comprises:

conditional upon a selected portion of the table structure satisfying a rewrite criterion, rewriting the selected portion of the table structure in accordance with a rewrite rule corresponding to the rewrite criterion.

3. The storage medium as set forth in claim 2, wherein the rewriting is configured to remove any cell crossings or containments using one or more rewrites.

4. A method for determining a table structure, the method comprising:

deriving a spatially ordered sequence of rectangular cells disposed in a two-dimensional region; and parsing the spatially ordered sequence of rectangular cells in accordance with a two-dimensional structural grammar having terminal elements corresponding to cells and non-terminal elements corresponding to structural relationship operators, the parsing producing a grammatical expression with the cells represented by terminal elements and structural relationships represented by non-terminal elements;

wherein each cell of the derived spatially ordered sequence of rectangular cells is represented by two points corresponding to opposing corners of the cell, and the ordered sequence of rectangular cells employs a spatial ordering based on coordinates of the points wherein each point is represented by two rectilinear coordinates, and the spatial ordering is in accordance with:

$$\langle p_1,p_2\rangle \prec \langle p_3,p_4\rangle \Leftrightarrow (p_1 \prec p_3) \vee (p_1 = p_3 \wedge (p_2 \prec p_4))$$

where $\langle p_1,p_2\rangle$ and $\langle p_3,p_4\rangle$ denote two cells, $p_1, p_2, p_3, p_4$ denote points representing said cells, and the spatial ordering of points is in accordance with:

$$p_1 \prec p_2 \Leftrightarrow (p_1.\alpha < p_2.\alpha) \vee (p_1.\alpha = p_2.\alpha \wedge p_1.\beta < p_2.\beta)$$

where the notation "p.α" denotes an α-coordinate of a point denoted by "p", and the notation "p.β" denotes a β-coordinate of the point denoted by "p", the α and β coordinates being mutually orthogonal.

5. The method as set forth in claim 4, wherein the method is performed by a processor executing software.

6. A method for determining a table structure, the method comprising:

deriving a spatially ordered sequence of rectangular cells disposed in a two-dimensional region; and parsing the spatially ordered sequence of rectangular cells in accordance with a two-dimensional structural grammar having terminal elements corresponding to cells and non-terminal elements corresponding to structural relationship operators, the parsing producing a grammatical expression with the cells represented by terminal elements and structural relationships represented by non-terminal elements;

wherein the structural relationship operators of the grammar include at least AboveLeft, AboveRight, AboveEq, LeftUpper, LeftBottom, and LeftEq, two-dimensional structural relationship operators.

7. The method as set forth in claim 6, wherein the structural relationship operators of the grammar further include Contains and Overlaps two-dimensional structural relationship operators.

8. The method as set forth in claim 7, wherein the method is performed by a processor executing software.

9. The method as set forth in claim 6, wherein the method is performed by a processor executing software.

10. A storage medium storing software that is executable on a computer or digital device to perform a method for determining a table structure, the method comprising:

deriving a spatially ordered sequence of rectangular cells disposed in a two-dimensional region; and parsing the spatially ordered sequence of rectangular cells in accordance with a two-dimensional structural grammar having terminal elements corresponding to cells and non-terminal elements corresponding to structural relationship operators, the parsing producing a table structure comprising a grammatical expression with the cells represented by terminal elements and structural relationships represented by non-terminal elements, wherein the parsing comprises:

generating an existing grammatical expression including an initial two terminal elements representing a first two cells of the spatially ordered sequence of rectangular cells and a non-terminal element representing a relationship between the initial two terminal elements;

extending the existing grammatical expression by adding a next terminal element indicative of a next cell of the spatially ordered sequence of rectangular cells and a non-terminal element indicative of a relationship between the next cell and the table structure represented by the existing grammatical expression; and repeating the extending until the existing grammatical expression includes terminal elements representing all cells of the spatially ordered sequence of rectangular cells.

11. The storage medium as set forth in claim 10, wherein the parsing further comprises:

selectively applying grammatical rewrite rules to rewrite at least a portion of the existing grammatical expression.

12. The storage medium as set forth in claim 10, wherein the method further comprises:

conditional upon completion of the parsing, identifying the spatially ordered sequence of rectangular cells as corresponding to a table; and conditional upon a failure of the parsing, identifying the spatially ordered sequence of rectangular cells as not corresponding to a table.

13. The storage medium as set forth in claim 10, wherein each cell of the derived spatially ordered sequence is represented by two points corresponding to opposing corners of the cell, and the ordered sequence employs a spatial ordering based on coordinates of the points.

* * * * *